Figure 1:
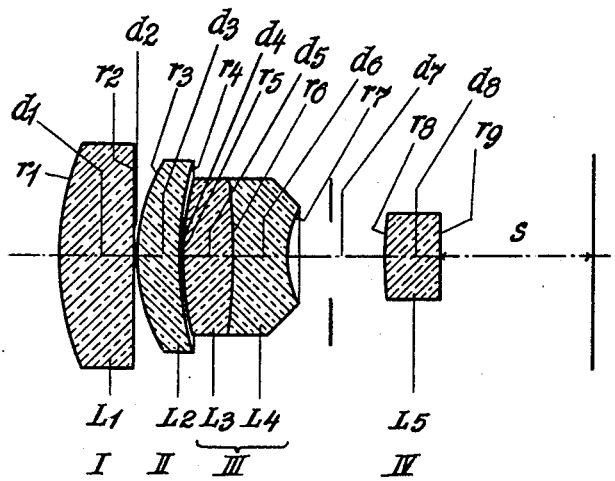

Nov. 24, 1959    R. SOLISCH    2,913,956
PHOTOGRAPHIC AND CINEMATOGRAPHIC OBJECTIVE OR LARGE FOCAL LENGTH
Filed Feb. 21, 1958

INVENTOR:
RUDOLF SOLISCH
BY
Karl F. Ross
AGENT

United States Patent Office 2,913,956
Patented Nov. 24, 1959

2,913,956

PHOTOGRAPHIC AND CINEMATOGRAPHIC OBJECTIVE OF LARGE FOCAL LENGTH

Rudolf Solisch, Gottingen, Germany, assignor to Isco Optische Werke G.m.b.H., Gottingen-Weende, Germany Application February 21, 1958, Serial No. 716,716

Claims priority, application Germany March 15, 1957

6 Claims. (Cl. 88—57)

My present invention relates to optical objectives of large focal length designed for photographic or cinematographic cameras.

A known type of objective of large focal length comprises a group of three components positioned forwardly of a diaphragm space, i.e. on the object side of the system, and a single component behind this space, i.e. on the image side. The general object of my invention is to provide an improved system of this type in which the back-focal distance is small, preferably less than one-third of the overall focal length, and which can be designed for relative apertures up to 1:4 or even 1:2.8 without objectionable distortion. A more particular object of the invention is to provide an objective system of this character whose image-side portion is of reduced dimensions to facilitate installation in certain types of camera.

According to a feature of my invention there is provided an objective system of the general type referred to whose three object-side components, the first two of which are advantageously in the form of positive menisci facing with their convex sides away from the diaphragm space and the third of which preferably consists of two cemented or air-spaced members of opposite refractivity, are so dimensioned that the axial thickness of the foremost component exceeds 12% of the overall focal length of the system and that the combined axial thickness of the other two front components (including their intervening air space or spaces) exceeds 25% of this overall focal length.

Other features of my improved system, designed to afford maximum correction of aberrations, are the provision of a single positive lens of axial thickness greater than 10% of the overall focal length as the image-side component and a design of all the components in such manner that the total physical length of the system, measured from the rear vertex of the sole back component to the forward vertex of the foremost front component, exceeds 200% of the back-focal distance measured between the aforesaid rear vertex and the image plane. Another feature desirable from the viewpoint of stressing aberrations is a relative dimensioning of the radii of adjacent surfaces of the second and third front components in such manner that the air space defined thereby has the shape of a negative meniscus.

A further feature of the invention, designed to reduce the manufacturing cost of my improved objectives, resides in the selection of glasses for the first front component and for the forward (positive) lens element of the third front component having an index of refraction less than 1.59 for the yellow helium line of the spectrum, it being at the same time desirable to give the rear (negative) lens element of the third component an index of refraction exceeding by 0.12 that of its positive mate.

Figure 2:
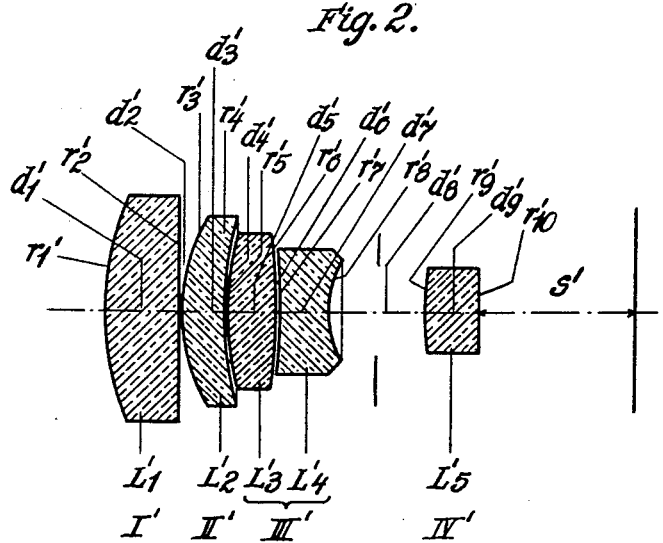

The invention will be further described with reference to the accompanying drawing in which Figs. 1 and 2 represent two embodiments. In Fig. 1 I have shown an optical objective with three front components I, II, III and one rear component IV separated by a diaphragm space. Component I is a positive meniscus $L_1$ having radii $r_1$, $r_2$ and thickness $d_1$; component II, separated from component I by an air space $d_2$, is a similar meniscus $L_2$ having radii $r_3$, $r_4$ and thickness $d_3$. A further air space $d_4$, having the shape of a negative meniscus, separates component II from component III which is a dispersive, meniscus-shaped doublet composed of a biconvex lens $L_3$ (radii $r_5$, $r_6$ and thickness $d_5$) and a biconcave lens $L_4$ (radii $r_6$, $r_7$ and thickness $d_6$). Beyond the diaphragm space $d_7$ there is provided the single rear component IV in the form of a positive meniscus $L_5$ having radii $r_8$, $r_9$ and thickness $d_8$.

With an overall focal length of numerical value 100, a back-focal distance $s'=30.08$ and an aperture ratio up to 1:2.8, the radii $r_1$ to $r_9$ and the thicknesses and separations $d_1$ to $d_8$ of lenses $L_1$ to $L_5$ as well as their refractive indices $n_d$ and their Abbé numbers $\nu$ may have numerical values substantially as given in the following table:

*Table 1*

| | | | | $n_d$ | $\nu$ |
|---|---|---|---|---|---|
| I | $L_1$ | $r_1=+\ 57.20$ | $d_1=14.87$ | 1.5690 | 56.0 |
| | | $r_2=+332.67$ | $d_2=\ 0.08$ | air space | |
| II | $L_2$ | $r_3=+\ 36.19$ | $d_3=\ 8.39$ | 1.6030 | 60.7 |
| | | $r_4=+\ 69.39$ | $d_4=\ 0.15$ | air space | |
| III | $L_3$ | $r_5=+\ 53.73$ | $d_5=\ 9.76$ | 1.5673 | 42.8 |
| | | $r_6=-138.28$ | | | |
| | $L_4$ | | $d_6=10.83$ | 1.7215 | 28.7 |
| | | $r_7=+\ 20.46$ | $d_7=17.54$ | air (diaphragm) space | |
| IV | $L_5$ | $r_8=+\ 64.40$ | $d_8=11.44$ | 1.6990 | 30.1 |
| | | $r_9=+533.48$ | | | |
| | | | $d_{total}=73.06$ | | |

In Fig. 2 I have shown a modified system comprising a front portion consisting of the three components I', II', III' and a rear portion represented by the single rear component IV'; components I', II' and IV' are single lenses $L_1'$ (radii $r_1'$, $r_2'$ and thickness $d_1'$), $L_2'$ (radii $r_3'$, $r_4'$ and thickness $d_3'$) and $L_5'$ (radii $r_9'$, $r_{10}'$ and thickness $d_9'$) similar to the corresponding lenses $L_1$, $L_2$, $L_5$ in Fig. 1. Component III' differs from its counterpart in Fig. 1 by the fact that its biconvex lens element $L_3'$ (radii $r_5'$, $r_6'$ and thickness $d_5'$) and its biconcave lens element $L_4'$ (radii $r_7'$, $r_8'$ and thickness $d_7'$) are no longer cemented together but are separated by an air space $d_6'$ having the shape of a positive meniscus, the convex side of this meniscus being turned toward the diaphragm space $d_8'$. The air spaces separating lens $L_2'$ from lenses $L_1'$ and $L_3'$ have been designated $d_2'$ and $d_4'$, respectively.

With the assumption of a numerical value 100 for the overall focal length of the system of Fig. 2, the same may have a back-focal distance $s'=29.93$ and an aperture ratio up to 1:2.8. The radii $r_1'$ to $r_{10}'$ and the thicknesses and separations $d_1'$ to $d_9'$ of its lenses $L_1'$ to $L_5'$ as well as their refractive indices $n_d$ and their Abbé numbers $\nu$ may have numerical values substantially as given in the following table:

Table 2

|  |  |  |  | $n_d$ | $\nu$ |
|---|---|---|---|---|---|
| I' | $L_1'$ | $r_1'=+ 57.28$ | $d_1'=14.89$ | 1.5582 | 67.8 |
|  |  | $r_2'=+372.90$ | $d_2'= 0.08$ | air space |  |
| II' | $L_2'$ | $r_3'=+ 36.24$ | $d_3'= 8.40$ | 1.6031 | 60.7 |
|  |  | $r_4'=+ 69.48$ | $d_4'= 0.15$ | air space |  |
| III' | $L_3'$ | $r_5'=+ 59.81$ | $d_5'= 9.78$ | 1.5673 | 42.8 |
|  |  | $r_6'=-138.55$ | $d_6'= 0.08$ | air space |  |
|  | $L_4'$ | $r_7'=-133.05$ | $d_7'=10.85$ | 1.7215 | 29.3 |
|  |  | $r_8'=+ 20.62$ | $d_8'=17.57$ | air (diaphragm) space |  |
| IV' | $L_5'$ | $r_9'=+ 64.49$ | $d_9'=11.46$ | 1.6990 | 30.1 |
|  |  | $r_{10}'=+534.27$ |  |  |  |
|  |  |  | $d'_{total}=73.26$ |  |  |

An examination of both the foregoing tables shows that in each instance the axial thickness of the first front component $L_1$ or $L_1'$ lies between the numerical values 12 and 16.5, that the sum of thicknesses $d_3$ to $d_6$ or $d_3'$ to $d_7'$ of the second and third components ranges between numerical values 25 and 33, and that the thickness $d_8$ or $d_9'$ of the rear component $L_5$ or $L_5'$ is between numerical values 10 and 13.5. Also, the indices of refraction $n_d$ of lenses $L_1$, $L_1'$ and $L_3$, $L_3'$ for the yellow helium line are less than 1.59 whereas the refractive indices of lenses $L_4$, $L_4'$ exceed those of lenses $L_3$, $L_3'$ by more than 0.12. The total physical length $d_{total}$, $d'_{total}$ is in each case more than double but less than triple its back-focal distance $s$, $s'$.

Within the operative limits given hereinabove and in the appended claims, the parameters of an objective system of the general character set forth may be modified without departing from the spirit and scope of the invention.

I claim:

1. An optical objective system with a back-focal distance less than one-third its overall focal length, comprising a three-component front portion consisting of a positive first component, a positive second component and a negative third component; and a rear portion separated from said front portion by a diaphragm space, said rear portion consisting of a positive fourth component; the axial thickness of said first component being greater than 12% but less than 16.5% of said overall focal length, the total thickness of said second and third components being greater than 25% but less than 33% of said overall focal length, said third component being composed of a positive and a negative lens element, the axial thickness of said fourth component exceeding 10% but being less than 13.5% of said overall focal length, said first and second components consisting each of a meniscus-shaped lens element turning its convexity away from said diaphragm space, the combined axial length of said portions and of said diaphragm space being greater than twice but less than three times said back-focal distance, said second and third components enclosing a distinctly negative-meniscus-shaped air space.

2. An optical system according to claim 1 wherein said negative lens element is a biconcave lens and said positive lens element is a biconvex lens.

3. An optical system according to claim 2 wherein said biconcave lens is cemented onto and follows said biconvex lens.

4. An optical system according to claim 3 wherein said first, second and fourth components are single lenses $L_1$, $L_2$ and $L_5$, respectively, and wherein the radii $r_1$ to $r_9$, the thicknesses and separations $d_1$ to $d_8$, the refractive indices $n_d$ and the Abbé numbers $\nu$ of said lenses $L_1$, $L_2$, $L_5$, said biconvex lens $L_3$ and said biconvex lens $L_4$ have numerical values, based upon an overall focal length of numerical value 100, substantially as given in the following table:

|  |  |  | $n_d$ | $\nu$ |
|---|---|---|---|---|
| $L_1$ | $r_1=+ 57.20$ | $d_1=14.87$ | 1.5690 | 56.0 |
|  | $r_2=+332.67$ | $d_2= 0.08$ | air space |  |
| $L_2$ | $r_3=+ 36.19$ | $d_3= 8.39$ | 1.6030 | 60.7 |
|  | $r_4=+ 69.39$ | $d_4= 0.15$ | air space |  |
| $L_3$ | $r_5=+ 59.73$ | $d_5= 9.76$ | 1.5673 | 42.8 |
| $L_4$ | $r_6=-138.28$ | $d_6=10.83$ | 1.7215 | 28.7 |
|  | $r_7=+ 20.46$ | $d_7=17.54$ | air (diaphragm) space |  |
| $L_5$ | $r_8=+ 64.40$ | $d_8=11.44$ | 1.6990 | 30.1 |
|  | $r_9=+533.48$ |  |  |  |

5. An optical system according to claim 2 wherein said biconcave lens follows said biconvex lens and is separated therefrom by an air space in the shape of a positive meniscus.

6. An optical system according to claim 5 wherein said first, second and fourth components are single lenses $L_1'$, $L_2'$ and $L_5'$, respectively, and wherein the radii $r_1'$ to $r_{10}'$, the thicknesses and separations $d_1'$ to $d_9'$, the refractive indices $n_d$ and the Abbé numbers $\nu$ of said lenses $L_1'$, $L_2'$, $L_5'$, said biconvex lens $L_3'$ and said biconvex lens $L_4'$ have numerical values, based upon an overall focal length of numerical value 100, substantially as given in the following table:

|  |  |  | $n_d$ | $\nu$ |
|---|---|---|---|---|
| $L_1'$ | $r_1'=+ 57.28$ | $d_1'=14.89$ | 1.5582 | 67.8 |
|  | $r_2'=+372.90$ | $d_2'= 0.08$ | air space |  |
| $L_2'$ | $r_3'=+ 36.24$ | $d_3'= 8.40$ | 1.6031 | 60.7 |
|  | $r_4'=+ 69.48$ | $d_4'= 0.15$ | air space |  |
| $L_3'$ | $r_5'=+ 59.81$ | $d_5'= 9.78$ | 1.5673 | 42.8 |
|  | $r_6'=-138.55$ | $d_6'= 0.08$ | air space |  |
| $L_4'$ | $r_7'=-133.05$ | $d_7'=10.85$ | 1.7215 | 29.3 |
|  | $r_8'=+ 20.62$ | $d_8'=17.57$ | air (diaphragm) space |  |
| $L_5'$ | $r_9'=+ 64.49$ | $d_9'=11.46$ | 1.6990 | 30.1 |
|  | $r_{10}'=+534.27$ |  |  |  |

References Cited in the file of this patent

UNITED STATES PATENTS

| 1,584,272 | Bertele | May 11, 1926 |
| 1,998,704 | Bertele | Apr. 23, 1935 |
| 2,105,799 | Tronnier | Jan. 18, 1938 |
| 2,141,733 | Bertele | Dec. 27, 1938 |
| 2,481,688 | Schade et al. | Sept. 13, 1949 |
| 2,543,856 | Kupka | Mar. 6, 1951 |
| 2,622,479 | Bertele | Dec. 23, 1952 |

FOREIGN PATENTS

| 350,323 | Great Britain | June 11, 1931 |